Jan. 24, 1967  R. HATSCHEK  3,299,711
METHOD FOR THE DIRECT MEASUREMENT OF PRESSURE DIFFERENCES
Filed Aug. 20, 1963
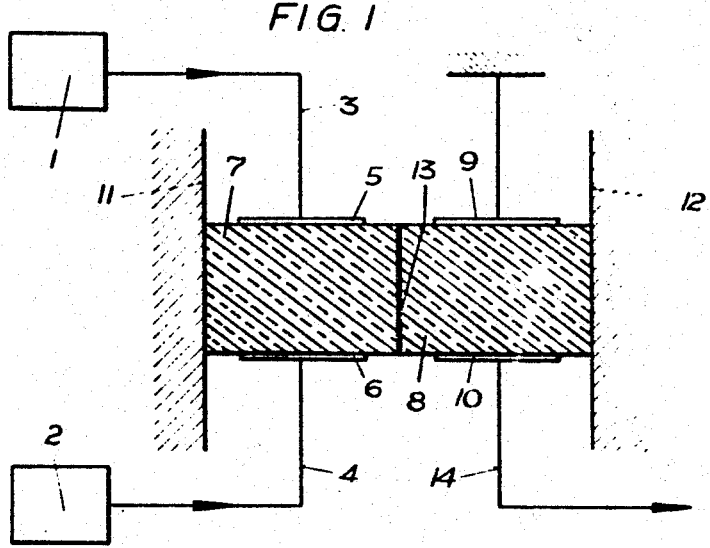
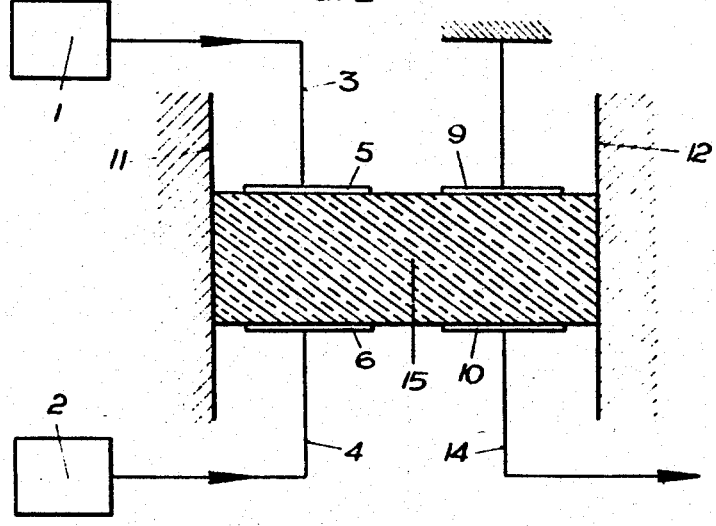
Inventor
Rudolf Hatschek
By
Watson Cole Grindle + Watson
Attys.

United States Patent Office 3,299,711
Patented Jan. 24, 1967

3,299,711
METHOD FOR THE DIRECT MEASUREMENT
OF PRESSURE DIFFERENCES
Rudolf Hatschek, Vienna, Austria, assignor to
Hans List, Graz, Austria
Filed Aug. 20, 1963, Ser. No. 303,296
Claims priority, application Austria, Aug. 24, 1962,
A 6,817/62
4 Claims. (Cl. 73—398)

In order to determine minor pressure differences with at least a certain amount of accuracy, as is frequently necessary for the testing of internal combustion engines for example, it is advisable to measure the said difference directly so as to preclude subsequent differences resulting from two individual pressures. According to a conventional process, two quartz transducers of identical sensitivity comprising antipolar quartz columns are being used, their signals being transmitted to an electrometer used as a measuring instrument. The inherent drawback of this process is due to the fact that transducers with antipolar quartz columns are not generally available in the trade and have therefore, to be custom-built at considerable expense.

According to another known process the individual pressures are measured by means of homopolar transducers using two distinct electrometer steps, the difference, if any, being determined by electronic means at a phase-reverter stage. This arrangement is also unsatisfactory inasmuch as pressure differences have to be measured with the same measuring range as individual pressures, so that particularly in such cases where minor pressure differences are to be measured, sufficient accuracy cannot be achieved.

It is the purpose of the invention to overcome these drawbacks of conventional methods while preserving their advantageous features. It is based upon a method of directly measuring pressure differences by which the individual pressures are measured by means of two homopolar, preferably piezoelectric transducers transmitting electrical output signals corresponding to the individual pressures. According to the invention the output signals of the two transducers are electrostrictively transformed into mechanical impulses corresponding to the pressure differences which are then transduced into an electrical signal corresponding to the pressure difference either by piezoelectric or magnetostrictive means or by means of a piezoresistance effect with semi-conductors. As compared with conventional methods using two homopolar transducers the process according to the invention offers the advantage of considerably greater accuracy. In addition, complicated electrometer arrangements may be dispensed with and commercial types of transducers may be used for the purpose.

According to another feature of the invention an electrostrictive body is provided for the practical performance of the method according to the invention, said body comprising two electrodes, one of which is loaded by the output signal of a transducer. Inasmuch as consequently, the signals transmitted by the two electrodes are identical and correspond to the individual pressures, the electrostrictive body is thrown into vibration only if and when the two signals differ from each other, revealing the presence of a pressure difference, the mechanical impulses produced by the electrostrictive body corresponding exactly to the pressure difference to be measured. Thus the apparatus according to the invention distinguishes itself by its extreme simplicity.

According to a further embodiment of the invention another piezoelectric body may be mechanically coupled with the electrostrictive body comprising electrodes for the electrical signal corresponding to the pressure difference. According to the invention the electrostrictive and/or piezoelectric body may itself comprise two additional electrodes for the transmission of the electrical signal corresponding to the pressure difference. By means of these equally simple arrangements the mechanical impulses produced by the electrostrictive body are transformable in a simple manner into an electric signal accurately corresponding to the pressure difference to be measured. By the selective use of suitable piezoelectric materials it is also possible to amplify the electric signals by means of the system according to the invention utilizing both the longitudinal and the transversal piezoelectric effect.

Further details of the invention will appear from the following description of several embodiments of the invention with reference to the accompanying drawing in which FIGURES 1 and 2 each show an example of an embodiment of the invention.

In the embodiment illustrated by FIGURE 1, the output signals corresponding to the individual pressures are transmitted by the transducers 1 and 2 via leads 3 and 4 to the electrodes 5 and 6 of a solid body 7 consisting of electrostrictive material. Adjacent to the electrostrictive body 7 is another solid body 8 of piezoelectric material presenting electrodes 9 and 10. The solid bodies 7 and 8 are rigidly clamped between two walls 11 and 12 and closely resting against each other with a bias alongside a precision-polished contact surface 13. The electrode 9 of the body 8 of piezoelectric material is connected to the frame, whereas the electrode 10 is connected via lead 14 to a measuring instrument, for example an electrometer (not shown).

The two transducers 1 and 2, illustrated only schematically in the accompanying drawing are of a commercial type and have been adapted to each other. Besides, the two transducers 1 and 2 are homopolar, connected in opposition and directly connected with the two electrodes 5 and 6. Since the latter are not grounded, the input signal acting on the electrostrictive body 7 corresponds to the difference between the signals of the transducers 1 and 2 indicating the respective individual pressures. This input signal is transformed by the electrostrictive body 7 into a mechanical impulse also corresponding exactly to the pressure difference to be measured. By means of the mechanical coupling between the two bodies 7 and 8 the impulses are transmitted from body 7 to body 8 so that as a result of deformations, loads are produced on its surface which are collected by the electrodes 9 and 10 and transmitted by the latter as an electric signal corresponding to the pressure difference.

The embodiment shown in FIGURE 2 differs from the one illustrated in FIGURE 1 insofar as the two bodies 7 and 8 have been replaced by a single body 15 of piezoelectric material. The body 15 is also rigidly clamped between two walls 11 and 12 and carries the two electrodes 5 and 6 connected with the transducers 1 and 2 via leads 3 and 4 on one side, and the electrodes 9 and 10 from which the electric signal corresponding to the pressure difference can be collected, on the other side. This arrangement is simpler than the one using two solid bodies since such precautions as have generally to be taken to ensure the proper transmission of force between the solid bodies are not here required.

In the two embodiments of the invention illustrated in and by the accompanying drawing the transversal piezoelectric effect is being utilized. However, it is also possible, within the scope of the invention, to use such arrangements as are operated with the use of the longitudinal piezoelectric effect. Again, the second solid body transforming the mechanical impulses of the electrostrictive body into an electric signal corresponding to the pressure difference can also be made of magnetostrictive material and co-operate with a probe, for example a magnetic probe, a coil or the like by means of which the signal is collected. Finally, it is also possible to use a varistor as the second solid body, said varistor consisting preferably of a single germanium or silicon crystal and also comprising the required electrodes.

I claim:

1. A method for directly measuring pressure differences, wherein piezoelectric transducers are provided, comprising, measuring the individual pressures by two homopolar piezoelectric transducers transmitting output signals corresponding to the individual pressures, transforming the output signals of the said transducers by electrostrictive means into mechanical impulses corresponding to the pressure difference, transforming the said impulses into an electric signal corresponding to the pressure difference.

2. A method as claimed in claim 1, whereby the said mechanical impulses are transformed by piezoelectric means into an electric signal corresponding to the pressure difference.

3. A method as claimed in claim 1, whereby the said mechanical impulses are transformed by electrostrictive means into an electric signal corresponding to the pressure difference.

4. A method as claimed in claim 1, whereby the said mechanical impulses are transformed by using the piezo-resistance effect in semiconductors into an electric signal corresponding to the pressure difference.

References Cited by the Examiner
UNITED STATES PATENTS

| 1,902,184 | 3/1933 | Rieber | 73—71.4 |
|---|---|---|---|
| 2,767,336 | 10/1956 | Arenberg | 310—8.3 |

OTHER REFERENCES

De Micheal Abstract 59,091, O.G., Apr. 29, 1952, vol. 657, p. 1585.

LOUIS R. PRINCE, *Primary Examiner.*

DAVID SCHONBERG, *Examiner.*

DONALD O. WOODIEL, *Assistant Examiner.*